(12) United States Patent
Hamad et al.

(10) Patent No.: US 11,910,953 B2
(45) Date of Patent: Feb. 27, 2024

(54) AUTOMATIC TEA BREWING METHODS AND ASSEMBLY

(71) Applicant: Haier US Appliance Solutions, Inc., Wilmington, DE (US)

(72) Inventors: Abdel Hamad, Louisville, KY (US); Hashim Siddiqui, Louisville, KY (US); Juan Huerta, Louisville, KY (US); Nabil Alhaffar, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 376 days.

(21) Appl. No.: 17/204,258

(22) Filed: Mar. 17, 2021

(65) Prior Publication Data

US 2022/0296033 A1    Sep. 22, 2022

(51) Int. Cl.
*A47J 31/52* (2006.01)
*A47J 31/06* (2006.01)
(Continued)

(52) U.S. Cl.
CPC ......... *A47J 31/5253* (2018.08); *A47J 31/002* (2013.01); *A47J 31/0615* (2013.01); *A47J 31/10* (2013.01); *A47J 31/40* (2013.01)

(58) Field of Classification Search
CPC .. A47J 31/5253; A47J 31/002; A47J 31/0615; A47J 31/10; A47J 31/40
(Continued)

(56) References Cited

U.S. PATENT DOCUMENTS

| 10,820,748 | B1 * | 11/2020 | Garcia | A47J 31/52 |
| 2012/0304868 | A1 * | 12/2012 | Li | A47J 31/18 |
| | | | | 99/289 R |

(Continued)

FOREIGN PATENT DOCUMENTS

| CN | 108013757 A | * | 5/2018 |
| EP | 3366172 A1 | * | 8/2018 |

(Continued)

OTHER PUBLICATIONS

Hahn, EP 3366172 A1, 2018, English translated description (Year: 2018).*

(Continued)

*Primary Examiner* — Tu B Hoang
*Assistant Examiner* — Damon Joel David Alfaro
(74) *Attorney, Agent, or Firm* — Dority & Manning, P.A.

(57) ABSTRACT

A tea making appliance may include a base, a particulate guide, a tea leaf container, a motorized leaf distributor, a reservoir, a water pump, a heating element, and a controller. The base may define a dispenser cavity. The particulate guide may be directed at the dispenser cavity. The motorized leaf distributor may be provided to selectively provide tea leaves to the particulate guide. The water pump may be in fluid communication with the reservoir upstream from the dispenser cavity to direct water thereto. The controller may be configured to initiate an automated brewing operation that includes receiving one or more data points regarding a physical user condition, selecting a personalized tea style based on the received one or more data points, and dispensing a predetermined tea mass of the personalized tea style automatically in response to selecting the personalized tea style.

11 Claims, 7 Drawing Sheets

(51) Int. Cl.
*A47J 31/00* (2006.01)
*A47J 31/40* (2006.01)
*A47J 31/10* (2006.01)

(58) Field of Classification Search
USPC ...... 99/279, 280–283, 288, 289 R, 299–300, 99/323.3
See application file for complete search history.

(56) References Cited

U.S. PATENT DOCUMENTS

| | | | | |
|---|---|---|---|---|
| 2017/0172340 | A1* | 6/2017 | Baarman | A47J 31/5253 |
| 2018/0168385 | A1* | 6/2018 | Boone | G06Q 30/0621 |
| 2019/0029464 | A1* | 1/2019 | Qiu | A47J 31/4403 |

FOREIGN PATENT DOCUMENTS

| | | | |
|---|---|---|---|
| EP | 3366172 A1 | | 8/2018 |
| KR | 20020016218 A | * | 3/2002 |
| WO | WO-2012045860 A1 | * | 4/2012 |
| WO | WO-2017193572 A1 | * | 11/2017 |
| WO | WO-2019222571 A1 | * | 11/2019 |

OTHER PUBLICATIONS

Liu, WO 2017193572 A1, 2017, English (Year: 2017).*
https://www.kickstarter.com/projects/1350821327/teplo-connected-tea-pot-for-personalized-tea-exper?ref=section-design-tech-featured-project-list-discovery.

* cited by examiner

AUTOMATIC TEA BREWING METHODS AND ASSEMBLY

FIELD OF THE INVENTION

The present subject matter relates generally to methods and assemblies for brewing tea, and more particularly to methods and assemblies for automatically brewing personalized tea beverages.

BACKGROUND OF THE INVENTION

Brewed beverages, such as teas, have been known for many years to have various benefits for consumers of those beverages. In some cultures, teas have even been used as medicine to treat certain diagnosed conditions or ailments. Some teas may be effective in aiding digestion, managing stress, reducing blood pressure, improving sleep, or increasing energy. Generally, the benefits of any given tea are specific to the tea leaves and brew style used.

In spite of these advantages, though, many consumers do not understand how to properly prepare or consume various brewed beverages in a way that will make effective or proper use of their advantages. For instance, a particular user may be unaware or have difficulty determining what brewed beverage may be beneficial at a given moment. Furthermore, the user may have difficulty how much of a given brewed beverage may be beneficial. Still further, even if the user does have some familiarity with the advantages of various teas, the user may be unaware of the proper preparation techniques for such teas.

As a result, an improved tea making assembly or method would be useful. In particular, it would be advantageous to provide an assembly or method capable of automatically preparing a tea that is personalized to a particular user.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of preparing a brewed beverage is provided. The method may include receiving one or more data points regarding a physical user condition. The method may further include selecting a personalized tea style based on the received one or more data points. The method may still further include dispensing a predetermined tea mass of the personalized tea style automatically in response to selecting the personalized tea style.

In another exemplary aspect of the present disclosure, a tea making appliance is provided. The tea making appliance may include a base, a particulate guide, a tea leaf container, a motorized leaf distributor, a reservoir, a water pump, a heating element, and a controller. The base may define a dispenser cavity. The particulate guide may be directed at the dispenser cavity. The tea leaf container may be mounted upstream from the particulate guide. The motorized leaf distributor may be provided to selectively provide tea leaves to the particulate guide. The reservoir may be disposed upstream from the dispenser cavity. The water pump may be in fluid communication with the reservoir upstream from the dispenser cavity to direct water thereto. The heating element may be provided in fluid communication with the reservoir upstream from the dispenser cavity to heat water thereto. The controller may be in operable communication with the motorized leaf distributor, the water pump, and the heating element. The controller may be configured to initiate an automated brewing operation that includes receiving one or more data points regarding a physical user condition, selecting a personalized tea style based on the received one or more data points, and dispensing a predetermined tea mass of the personalized tea style automatically in response to selecting the personalized tea style.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 1:
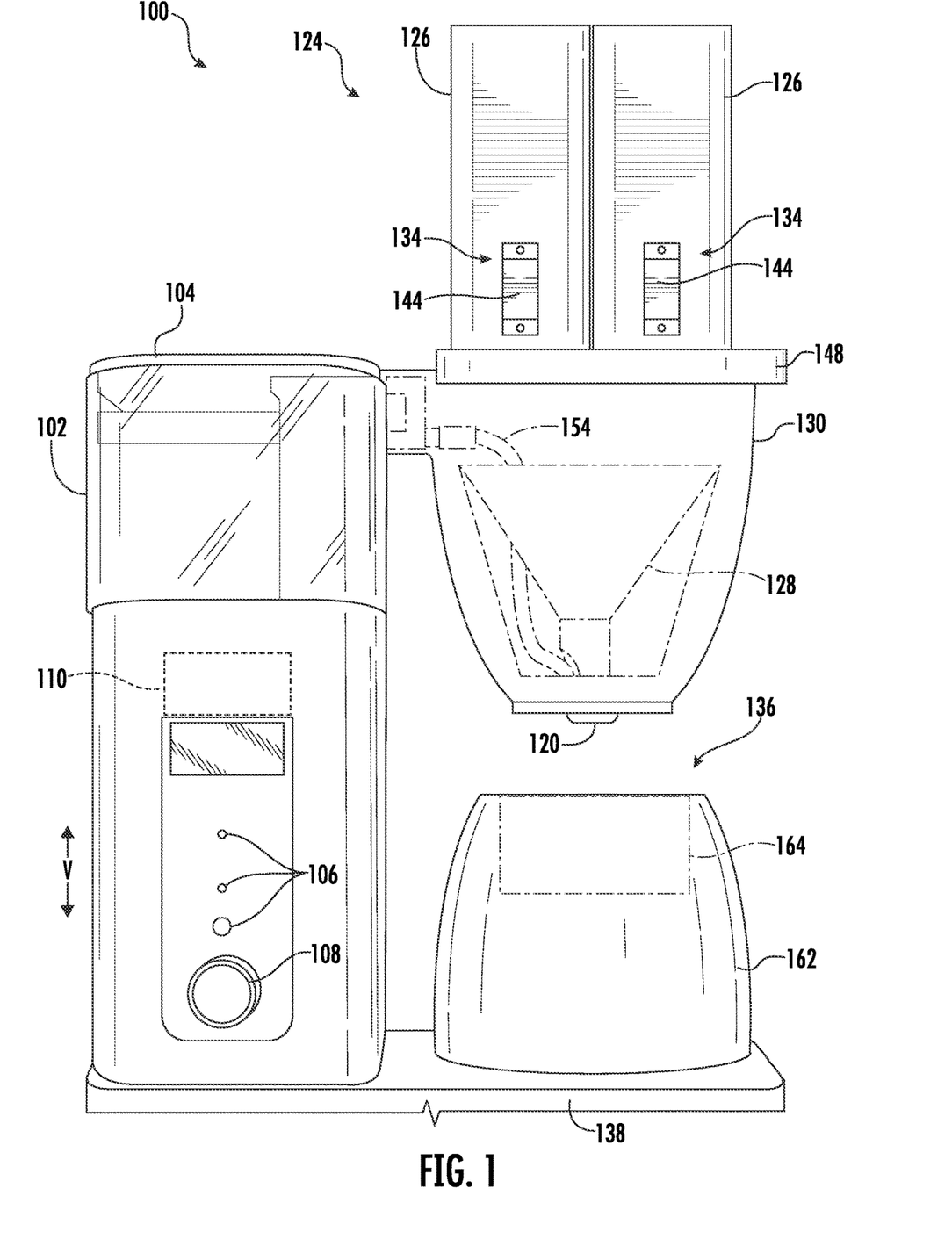
FIG. 1 provides a perspective view of a brewing appliance according to exemplary embodiments of the present disclosure.

Turning now to the figures, FIG. 1 provides a side perspective view of a brewing appliance 100 according to exemplary embodiments of the present disclosure. As illustrated in FIG. 1, the brewing appliance 100 defines a vertical direction V. In exemplary embodiments, the brewing appliance 100 includes a water tank or reservoir 102. Such a water reservoir 102 may be is open at a top end thereof and is selectively enclosed (e.g., by a reservoir lid 104). For instance, the reservoir lid 104 may be rotatably mounted (e.g., by one or more hinges) to the top end of the reservoir 102 to selectively rotate between a closed position (e.g., as illustrated in FIG. 1) where the reservoir 102, and in particular the open top end thereof, is enclosed by the lid 104 and an open position (not shown) permitting access to the reservoir 102 so that a user may fill the reservoir 102 with water for brewing. Water in the reservoir 102 may be drawn from the reservoir 102 to a brew nozzle 120 by a pump 122, as will be described in more detail below.

Figure 2:
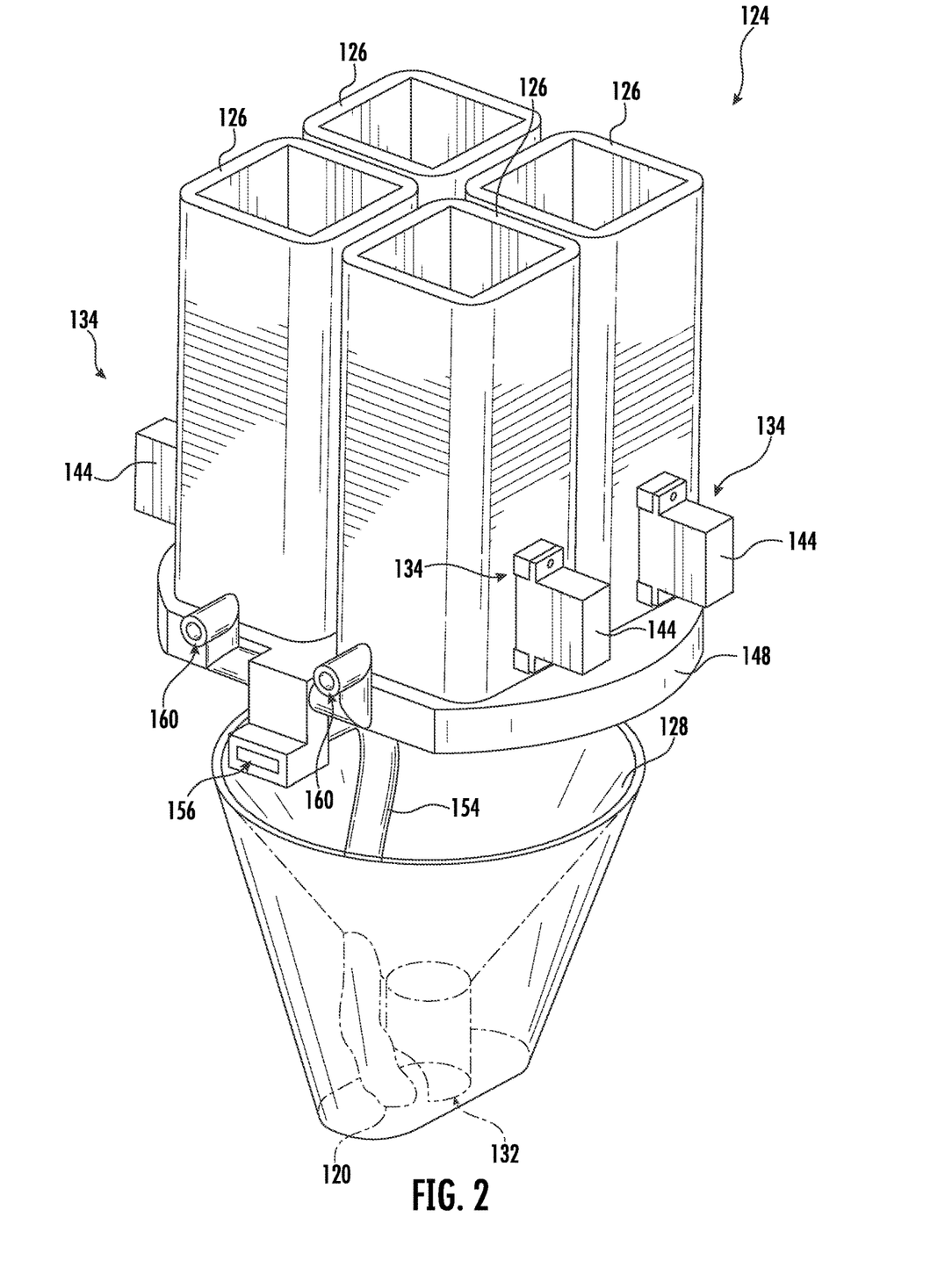
FIG. 2 provides a perspective view of a dispensing assembly of the exemplary brewing appliance of FIG. 1.
Figure 3:
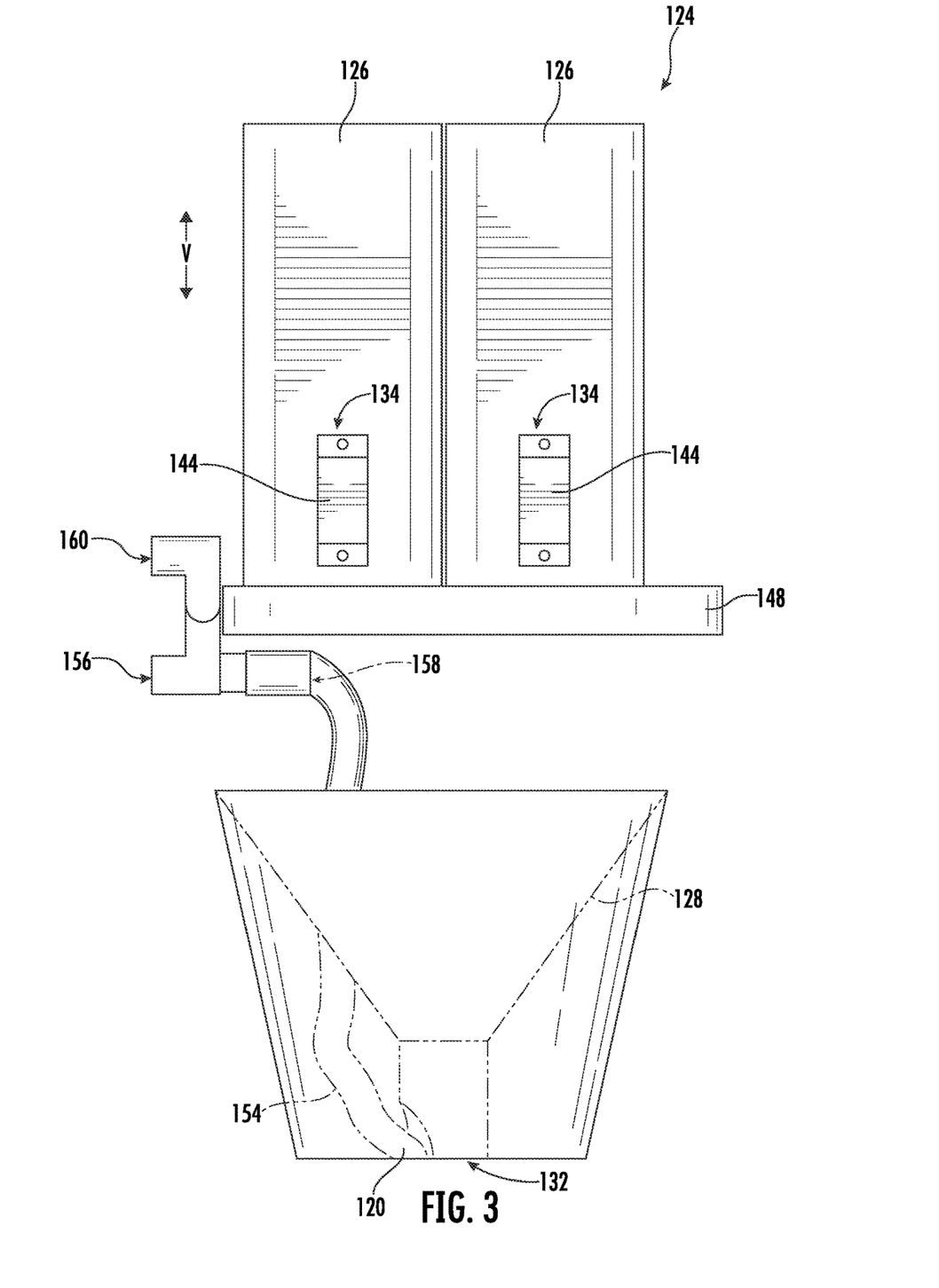
FIG. 3 provides an elevation view of the exemplary dispensing assembly of FIG. 2.

As shown, a leaf distribution assembly 124 may be provided on brewing appliance 100 apart from reservoir 102. Generally, leaf distribution assembly 124 includes one or more tea leaf containers 126 and a particulate guide 128 (e.g., mounted or defined within an upper guide frame 130). One or more motorized leaf distributors 134 may further be included to selectively provide or motivate tea leaves from the tea leaf containers 126 to the particulate guide 128. In some embodiments, particulate guide 128 is directed at a dispenser cavity 136 defined by a base 138 of the brewing appliance 100. For instance, particulate guide 128 may be mounted above dispenser cavity 136. A guide outlet 132 defined through a bottom wall of particulate guide 128 (e.g., along the vertical direction V) may thus permit tea leaves or particulate to pass from particulate guide 128 to dispenser cavity 136 (e.g., as motivated by gravity).

Figure 5:
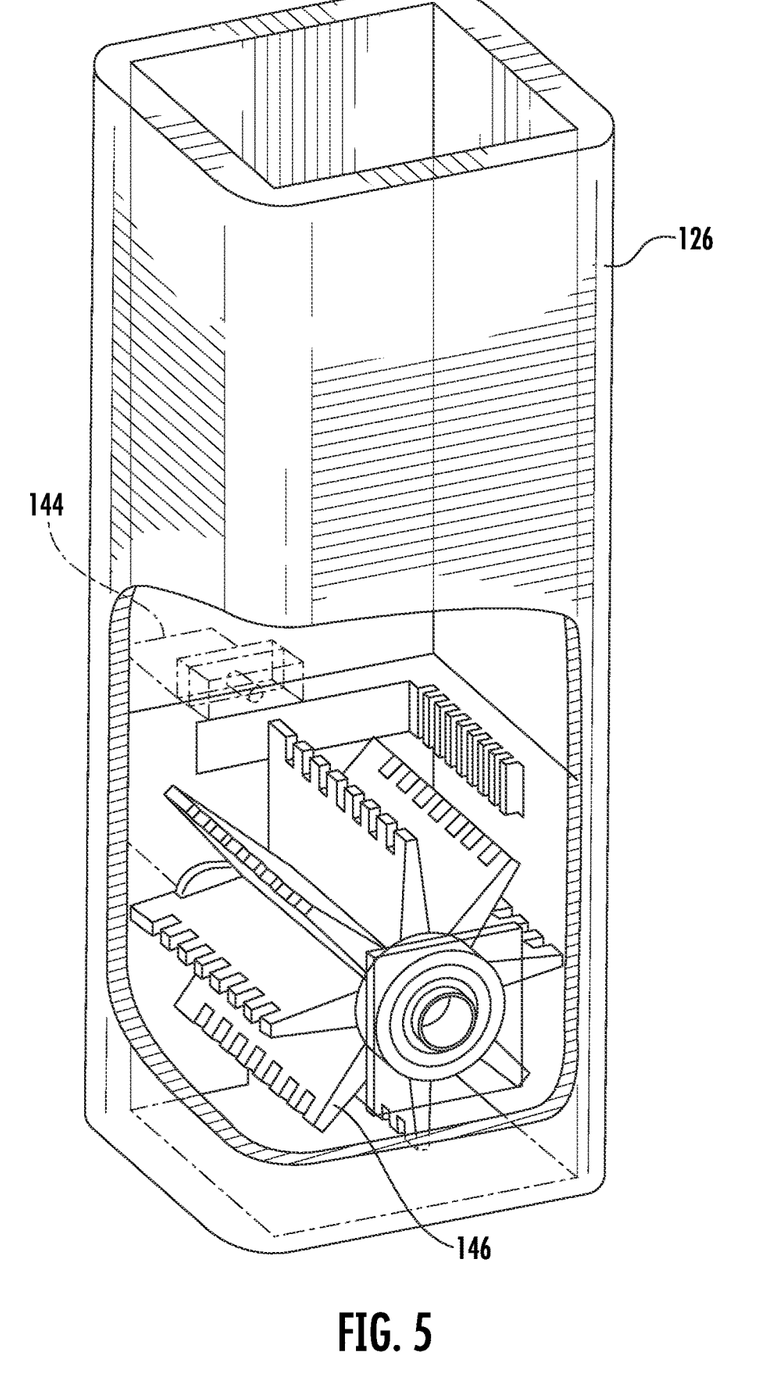
FIG. 5 provides a perspective view of a discrete tea leaf container and distributor of the exemplary brewing appliance of FIG. 1.

In some embodiments, multiple discrete tea leaf containers 126 are provided. As shown, each tea leaf container 126 may define a separate cavity within which a corresponding tea leaf type (e.g., black tea, green tea, white tea, oolong tea, Pu-erh tea, mate tea, rooibos tea, herbal/fruit tea, etc.) may be stored. For instance, white tea leaves may be stored in a first leaf container 126 while green tea leaves are stored in a second leaf container 126. Optionally, each leaf container 126 may correspond to a unique tea leaf type. In the illustrated embodiments, each leaf container 126 extends vertically such that an inlet end through which tea leaves may be received is disposed above an outlet end through which tea leaves may be dispensed.

In the illustrated embodiments, multiple separate motorized leaf distributors 134 are provided. Generally, each motorized leaf distributor 134 may include an electrically actuated motor 144 to selectively move a corresponding shutter 146. The shutter 146 may be movably mounted, for instance, within a corresponding tea leaf container 126. During use, actuation or activation of the electrically actuated motor 144 may thus cause the shutter 146 to move, thereby permitting or motivating tea leaves from a corresponding tea leaf container 126. In exemplary embodiments, the shutter 146 is provided as a paddle wheel. The electrically actuated motor 144 may define a rotation axis about which the paddle wheel can be rotated. As the shutter 146 rotates, a predetermined volume or mass of tea leaves may be released or motivated from the tea leaf container 126. In other words, the motorized leaf distributor 134 may be configured to release or motivate a known volume/mass of tea leaves in set increments measured per rotation or unit of rotation (e.g., 45°, 90°, 180°, etc.) about the rotation axis. Electrically actuated motor 144 may thus selectively rotate the shutter 146 according to a desired volume or mass of tea leaves. For instance, the electrically actuated motor 144 may move the shutter 146 one or more units of rotation about the rotation axis as a function of the volume or mass of tea leaves required by a particular brewing operation. Optionally, a discrete corresponding motorized leaf distributor 134 may be provided for each tea leaf container 126.

Figure 6:
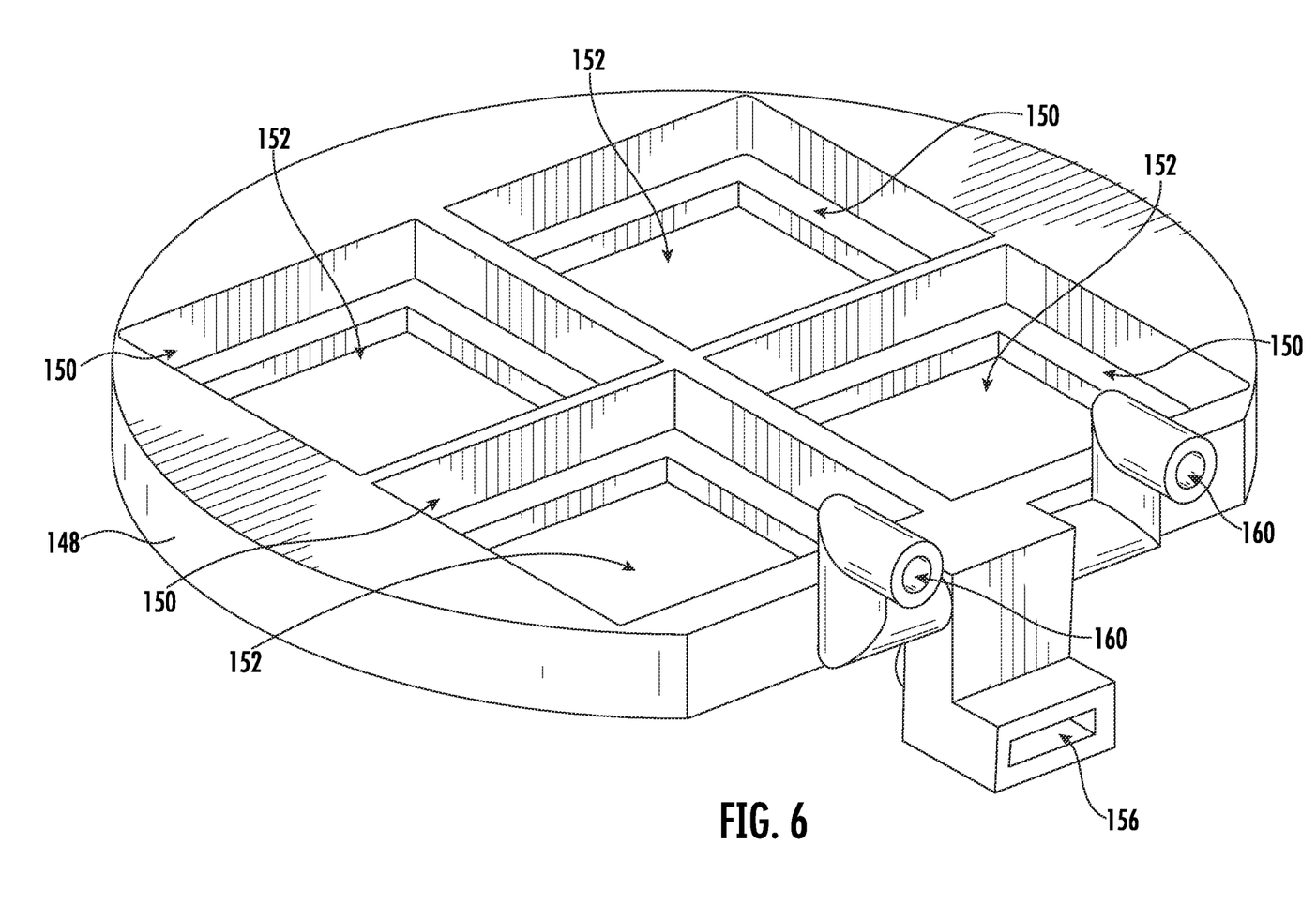
FIG. 6 provides a perspective view of a support frame of the exemplary brewing appliance of FIG. 1.

In some embodiments, a distributor mounting frame 148 is provided to support multiple tea leaf containers 126. As shown, distributor mounting frame 148 may define multiple recessed grooves 150 about multiple corresponding holes 152. When assembled, each tea leaf container 126 may be received and supported within a separate recessed groove 150 to release tea leaves through the corresponding holes 152. In certain embodiments, distributor mounting frame 148 is attached to upper guide frame 130 (e.g., directly above particulate guide 128). In turn, multiple tea leaf containers 126 may be supported above particulate guide 128 to selectively release tea leaves thereto.

Figure 4:
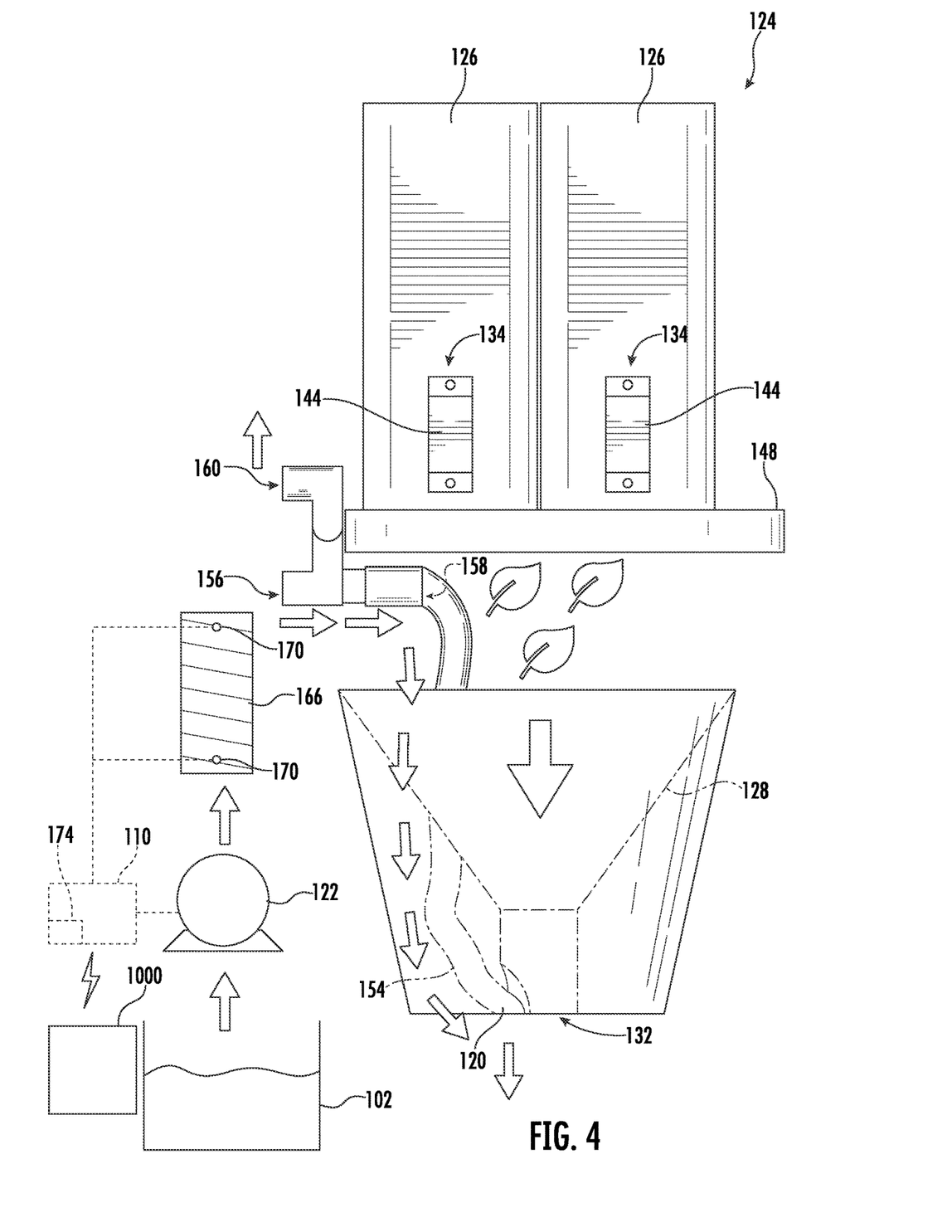
FIG. 4 provides a schematic view of various portions of the exemplary brewing appliance of FIG. 1.

Separate from or in addition to leaf distribution assembly 124, a brew nozzle 120 may be provided downstream from water pump 122 to supply or direct a flow of water from the reservoir 102 to the dispenser cavity 136. Thus, brew nozzle 120 may generally define one or more water outlet 158 and be disposed upstream from dispenser cavity 136. As would be understood, one or more pipes or water conduits may generally be provided within brewing appliance 100 to fluidly connect reservoir 102, water pump 122, and brew nozzle 120. In some embodiments, brew nozzle 120 is disposed directly above dispenser cavity 136. Optionally, brew nozzle 120 may be horizontally spaced apart from at least portion of guide outlet 132. In turn, water may be flowed to dispenser cavity 136 along a separate (e.g., fluidly parallel) path from tea leaves. In some such embodiments, at least one nozzle tube 154 is disposed within upper guide frame 130 along the fluid path between pump 122 and brew nozzle 120 apart from particulate guide 128.

In optional embodiments, one or more fluid passages may be defined through distributor mounting frame 148. For instance, a water inlet 156 may be defined along with a water outlet 158 downstream therefrom. When assembled, water inlet 156 and water outlet 158 may be disposed upstream from brew nozzle 120 (e.g., connected to nozzle tube 154 downstream from water pump 122). Heated water motivated by water pump 122 may thus be directed through distributor mounting frame 148 before passing to brew nozzle 120. In some such embodiments, one or more steam-release openings 160 may be defined by distributor mounting frame 148. In particular, steam-release openings 160 may be defined above water outlet 158 or water inlet 156. Such steam-release openings 160 may be defined downstream from water inlet 156 in fluid parallel to water outlet 158. In the illustrated embodiments, a vertical branch extends upwards from a portion of the water passage downstream from water inlet 156, extends horizontally rearward (e.g., away from dispenser cavity 136), and terminates at a pair of steam-release openings 160. As heated water flows through distributor mounting frame 148, water vapor or steam may be released upstream from brew nozzle 120. Advantageously, a consistent or steam-free flow of heated water may thus be provided from brew nozzle 120.

A beverage container 162 may be removably or selectively positioned on the base 138 (e.g., within the dispenser cavity 136). In some embodiments, beverage container 162 is selectively disposed below the upper guide frame 130 along the vertical direction V. Additionally or alternatively, beverage container 162 may be selectively disposed downstream from particulate guide 128 and brew nozzle 120 (e.g., directly therebelow). With the beverage container 162 so positioned, the beverage container 162 may receive separate flows of water and particulate (e.g., tea leaves) from dispensing assembly 124 by gravity.

In certain embodiments, a tea strainer or steeping basket 164 is held or disposed within beverage container 162. Generally, steeping basket 164 may be formed from or include a mesh or wire frame structure within which tea leaves may be held to steep for brewing. Thus, water may be permitted to pass through steeping basket 164 while tea leaves or particulate are substantially prevented from any such passage, as would be understood. In turn, tea leaves dispensed from particulate guide 128 may be held within beverage container 162 as heated water (e.g., from brew nozzle 120) extracts various water soluble chemicals or compounds from the tea leaves within steeping basket 164.

As noted above, water pump 122 may be in fluid communication with (e.g., between) reservoir 102 and brew nozzle 120. Generally, water pump 122 may include or be provided as any suitable electrically activated liquid pump structure. For instance, water pump 122 may include a positive-displacement pump (e.g., impeller pump, diaphragm pump, peristaltic pump, etc.), as would be understood. During use, water pump 122 may thus be selectively activated to urge or motivate water from reservoir 102 to brew nozzle 120 (and, in turn, beverage container 162).

Within brewing appliance 100, a boiler or heater 166 may be provided in fluid communication with brew nozzle 120 to heat water thereto. For instance, heater 166 may be disposed in upstream fluid communication with brew nozzle 120 or downstream fluid communication with water pump 122. In some embodiments, heater 166 may include or be provided as a tubular member with an electric heating element embedded or enclosed therein, whereby the heater 166 may raise the temperature of the water as the water flows through the tubular heater 166 and to brew nozzle 120. The heater 166 may include, for example, a resistive heating element (e.g., CALROD), inductive heating element, or another suitable heating element. In turn, water expelled from brew nozzle 120 may be first heated to an elevated or selected temperature (e.g., to interact with tea leaves within beverage container 162 for brewing a tea beverage).

In some embodiments, one or more selector inputs, such as buttons 106, one or more knobs 108, a touchpad, or touchscreen interfaces, etc., may be provided or mounted on the brewing appliance 100, such as on a control panel thereof, and are in operable communication (e.g., electrically coupled or wirelessly coupled through a wireless network band) with a processing device or controller 110, such as via one or more signal lines or shared communication busses. In response to user manipulation of the selector inputs, controller 110 operates the various components of brewing appliance 100 to execute selected cycles and features. The control panel may also include a display.

Generally, controller 110 may also be provided in operable communication with various components of the brewing appliance 100, such as the motorized leaf distributors 134, water pump 122, heater 166, as well as one or more sensors, such as temperature sensors 170 (e.g., thermocouples or thermistors) or body sensors (e.g., heart rate monitor, blood pressure monitor, thermometer, etc.) mounted to appliance 100. In turn, signals generated in controller 110 direct operation of such components (e.g., in response to one or more inputs 106, 108). For instance, the motorized leaf distributors 134 may be selectively and separately activated to release tea leaves to the beverage container 162. Pump 122 and heater 166 may be selectively directed or activated to motivate and heat water, respectively, to brew nozzle 120. Additionally or alternatively, controller 110 may receive one or more temperature signals from the one or more temperature sensors 170. Such temperature signals may correspond to a detected or measured value of temperature for water (e.g., water temperature in the heater 166 or of water downstream of the heater 166). Further additionally or alternatively, controller 110 may receive one or more user condition signals from the one or more body sensors. Such user condition signals may correspond to a detected or measured value of a user's heartrate, body temperature, or blood pressure (e.g., detected at brewing appliance 100 or at a remote device 1000).

As used herein, "processing device" or "controller" may refer to one or more microprocessors, microcontroller, ASICS, or semiconductor devices and is not restricted necessarily to a single element. The controller 110 may be programmed to operate brewing appliance 100 by executing instructions stored in memory (e.g., non-transitory media). The controller 110 may include, or be associated with, one or more memory elements such as RAM, ROM, or electrically erasable, programmable read only memory (EEPROM). In one embodiment, the processor executes programming instructions stored in memory. The memory may be a separate component from the processor or may be included onboard within the processor. For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller 110.

In optional embodiments, the brewing appliance 100 may also include a wireless communication module 174 configured to communicate over one or more wireless network, such as a local area network (e.g., intranet), wide area network (e.g., internet), low power wireless networks [e.g., Bluetooth Low Energy (BLE), or some combination thereof. For instance, wireless communications module 174 may include or be provided as a WI-FI or Bluetooth module. The wireless communication module 174 may be communicatively coupled to the controller 110 to send and receive signals to and from the controller 110, such as user inputs, user selections, or other inputs. For example, such inputs or selections may be received by the wireless communication module 174 from a remote user interface device 1000 and transmitted to the controller 110 by the wireless communication module 174. The remote user interface device 1000 may be a wearable fitness tracker (e.g., smartwatch), smartphone, tablet, computer, smart home system, or other similar device that is "remote" from the brewing appliance 100 in that the device 1000 is not, or need not be, physically connected to or integrated with the brewing appliance 100. The remote user interface device 1000 may include a memory for storing and retrieving programming instructions. For example, the remote user interface device 1000 may be a wearable fitness tracker operable to store and run applications, also known as "apps," and may include a remote user interface provided as a fitness tracker app. In some embodiments, remote user interface device 1000 further includes one or more body sensors configured to detect or measure one or more physical conditions of a user. For instance, such body sensors may include a heart rate monitor (e.g., including an electrocardiography sensor or photoplethysmography sensor), thermometer (e.g., including an infrared thermometer, liquid crystal thermometer, etc.), or blood pressure monitor (e.g., including a digital sphygmomanometer).

Figure 7:
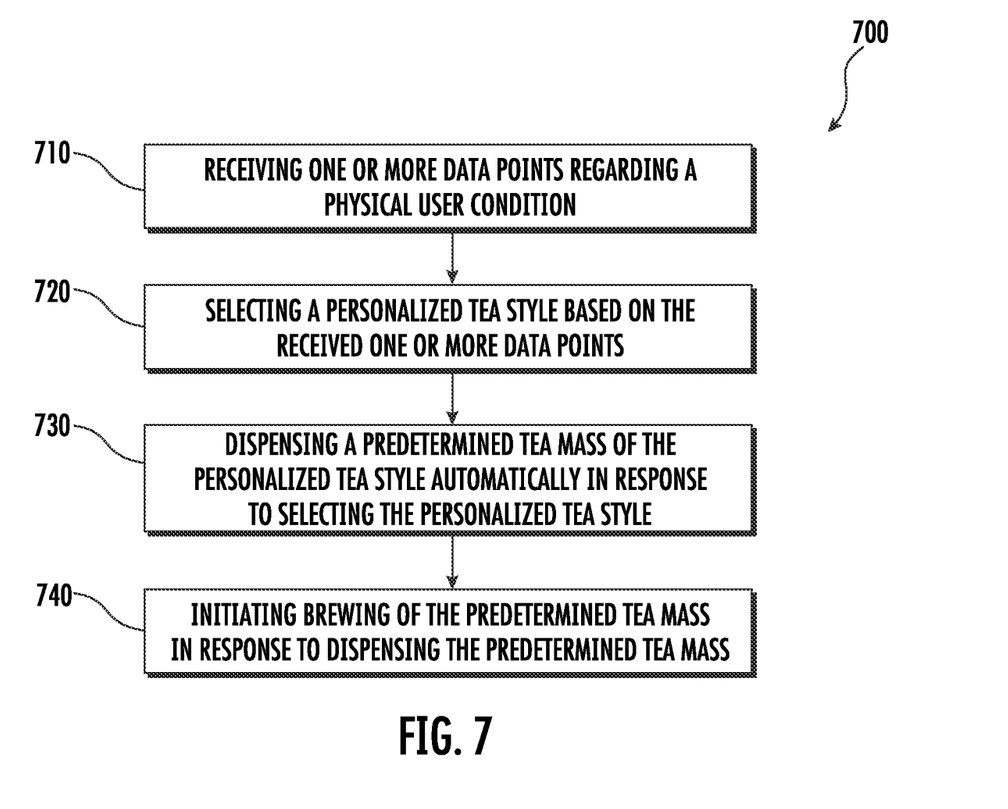
FIG. 7 provides a flow chart illustrating an exemplary method of operation of a brewing appliance.

FIG. 7 illustrates an exemplary method 700 for operating a brewing appliance according to an exemplary embodiment of the present disclosure. Method 700 can be used to operate any suitable brewing appliance, such as the example brewing appliance 100 of FIGS. 1 through 6. In particular, controller 110 may be programmed or configured to implement method 700 (e.g., as an automated brewing operation for generating a beverage). Utilizing method 700 various teas can advantageously be brewed automatically (e.g., without direct user input) according to one or more user conditions. In particular, the type of tea beverage generated during a brewing operation can be varied or tailored to the specific physical conditions of a particular user at a given moment, such that each brewing operation may provide a distinct and customized tea beverage for each user at any given moment.

As illustrated in FIG. 7, at 710, the method 700 includes receiving one or more data points regarding a physical user condition. As an example, such data points may be received as one or more measurements signals from a body sensor on the brewing appliance or remote user interface device. As an additional or alternative example, such data points may be received as one or more manual input signals received from control panel of the brewing appliance or from the remote user interface device. The data points (e.g., signals corresponding thereto) may be received unprompted by the brewing appliance (e.g., immediately in response to a measurement being taken or a preset time of the day being reached) or, alternatively, received in response to a user initiating a brewing operation (e.g., by engaging an input button or knob at the control panel of the brewing appliance). The data points may include a variable measured value relating to the user's health at a given moment, such as a measured heartrate, body temperature, or blood pressure (e.g., measured at one or more of the above-described body sensors). Additionally or alternatively, the data points may include chronic conditions or labels, such as a predetermined medical conditions (e.g., elevated blood pressure, obesity, diabetes, caffeine sensitivity, insomnia, arthritis, cancer, etc.), which may be input by a user prior to initiation of a brewing operation.

At 720, the method 700 includes selecting a personalized tea style based on the received one or more data points. Thus, 720 may follow 710 and the start of a particular brewing operation (e.g., initiated at the control panel of the brewing appliance). The selection of the personalized tea style may ensure that the personalized tea style matches or corresponds to the received data points. In some embodiments, a programmed chart, lookup table, or formula is provided within controller for automatically matching one or more received data points to a particular tea style. As a general example, an elevated (e.g., above a set threshold) heartrate, caffeine sensitivity, or insomnia, may indicate a need for a non-caffeinated tea type, such as rooibos tea or an herbal/fruit tea. By contrast, a reduced (e.g., below a set threshold) heartrate, obesity, or arthritis may indicate a need for a caffeinated tea type, such as black tea or green tea. As would be understood, any suitable number of factors may be considered and weighted in order to tailor selection of the tea style to the received data points.

In optional embodiments, the method 700 further includes determining a current time prior to or in tandem with the start of any brewing operation (i.e., prior to or in tandem with 720). For instance, the controller may include a clock or time module for tracking the time of day. As part of 720, the selection of a particular tea type may be further based on the current time. Certain times of day may thus be weighted in favor or, alternatively, against certain tea types being selected. For instance, caffeinated tea types may be given preference during a certain range of time (e.g., morning), while non-caffeinated tea types may be given preference during another range of time (e.g., evening).

In certain embodiments, 720 includes selecting the personalized tea style from a supplied plurality of tea styles stored in the discrete tea leaf containers. As described above, multiple tea leaf containers may be provided with the brewing appliance. Prior to a particular brewing operation, the particular tea types in each tea leaf container may be programmed within the controller (e.g., manually at the control panel or automatically based on one or more sensed conditions or markers within the tea leaf containers). In turn, the selection made at 720 may be limited to those tea types that are already available within the tea leaf containers.

At 730, the method 700 includes dispensing a predetermined tea mass of the personalized tea style automatically in response to selecting the personalized tea style. For instance, the predetermined mass may be released from the corresponding tea leaf container and to particulate guide or perforated steeping basket, as described above. In particular, the exact volume or mass of tea leaves corresponding to the predetermined mass (e.g., enough for a single serving) of the selected personalized tea style may be dispensed without further inputs or measurements from the user. In some such embodiments, 730 includes initiating motor rotation at a tea leaf container to motivate the predetermined tea mass therefrom. Specifically, the motor of the motorized leaf distributor in the selected tea leaf container may be rotated until the predetermined mass has been released from the tea leaf container, at which point rotation may stop.

A user may, thus, be advantageously provided with the selected tea type without having to discern the correct tea type or measure the predetermined mass.

At 740, the method 700 includes initiating brewing of the predetermined tea mass in response to dispensing the predetermined tea mass. Specifically, water (e.g., a predetermined volume of water) may be heated and flowed through the water nozzle to the beverage container, as described above. Moreover, a predetermined volume of heated water may be delivered to the beverage container.

In some embodiments, the water flowed through the water nozzle (i.e., delivered to the beverage container) is heated according to a predetermined water temperature. Optionally, the water temperature may be selected according to the personalized tea style. As would be understood, different tea styles may have different preferred brewing temperatures. As an example, white tea, green tea, or oolong tea may have a selected predetermined water temperature of 85° Celsius (e.g., within 10% thereof). As an additional or alternative example, black tea, Pu-erh tea, maté tea, rooibos tea, or herbal/fruit tea may have a selected predetermined water temperature of 100° Celsius (e.g., within 10% thereof). Once the predetermined water temperature is selected, the heater may be activated to heat a volume of brew water to (or slightly above) the predetermined water temperature such that the volume may be dispensed at the predetermined water temperature. Thus, heat generated at the heater may be selectively varied for 740 such that the volume of brew water from the water nozzle is dispensed at the predetermined water temperature corresponding to the personalized tea style.

In additional or alternative embodiments, a steep time may be selected according to the personalized tea style. The steep time may generally correspond to the time period for which the predetermined mass of tea leaves should steep or rest in the container following delivery of the water to the container (e.g., before being removed or before the tea beverage is ready for consumption). Thus, the steep time may provide a time period measured from the start or completion of delivery of the heated water to the beverage container. The steep time may be selected according to the personalized tea style. As would be understood, different tea styles may have different preferred steep times. As an example, white tea may have a selected predetermined steep time at a time value between about 1 and 2 minutes (e.g., within 10% thereof). As an additional or alternative example, green tea or oolong tea may have a selected predetermined steep time at a time value between about 1 and 3 minutes (e.g., within 10% thereof). As another additional or alternative example, black tea, mate tea, rooibos tea, or herbal/fruit tea may have a selected predetermined steep time at a time value between about 3 and 5 minutes (e.g., within 10% thereof). As yet another additional or alternative example, Pu-erh tea may have a selected predetermined steep time at a time value between about 2 and 5 minutes (e.g., within 10% thereof). Upon expiration of the steep time, an audio or visual alarm may be generated from the brewing appliance (e.g., as an alert tone, illuminated light, displayed message, etc.), as would be understood. Thus, the steep time of the tea beverage may be selectively varied for 740 such that a user is notified when the personalized tea style is ready for consumption.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tea making appliance comprising:
   a base defining a dispenser cavity;
   a particulate guide directed at the dispenser cavity;
   a first tea leaf container mounted upstream from the particulate guide;
   a second tea leaf container mounted upstream from the particulate guide, the second tea leaf container being separate from the first tea leaf container;
   a motorized leaf distributor to selectively provide tea leaves to the particulate guide;
   a reservoir disposed upstream from the dispenser cavity;
   a water pump in fluid communication with the reservoir upstream from the dispenser cavity to direct water thereto;
   a heating element provided in fluid communication with the reservoir upstream from the dispenser cavity to heat water thereto;
   a distributor mounting frame supporting the first tea leaf container and the second tea leaf container, the distributor mounting frame defining a water inlet downstream from the heating element and a water outlet downstream from the water inlet, the distributor mounting frame further defining a steam-release opening above the water inlet downstream from the water inlet in fluid parallel to the water outlet; and
   a controller in operable communication with the motorized leaf distributor, the water pump, and the heating element, the controller being configured to initiate an automated brewing operation comprising
      receiving one or more data points regarding a physical user condition,
      selecting a personalized tea style based on the received one or more data points, and
      dispensing a predetermined tea mass of the personalized tea style automatically in response to selecting the personalized tea style.

2. The tea making appliance of claim 1, wherein the automated brewing operation further comprises initiating brewing of the predetermined tea mass in response to dispensing the predetermined tea mass.

3. The tea making appliance of claim 1, wherein the automated brewing operation further comprises wherein initiating brewing comprises
   selecting a predetermined water temperature corresponding to the personalized tea style, and
   dispensing a volume of brew water at the predetermined water temperature.

4. The tea making appliance of claim 1, wherein at least one data point of the one or more data points is a measured heartrate, body temperature, or blood pressure.

5. The tea making appliance of claim 1, wherein at least one data point of the one or more data points is a predetermined medical condition.

6. The tea making appliance of claim 1, wherein the automated brewing operation further comprises determining a current time, wherein selecting the personalized tea style is further based on the determined current time.

7. The tea making appliance of claim 1, wherein the automated brewing operation further comprises wherein selecting the personalized tea style comprises selecting the personalized tea style from a supplied plurality of tea styles stored separately in the first and second tea leaf containers.

8. The tea making appliance of claim 1, further comprising a perforated steeping basket disposed within the dispenser cavity, wherein the automated brewing operation further comprises wherein dispensing the predetermined tea mass comprises directing the predetermined tea mass to the perforated steeping basket.

9. The tea making appliance of claim 1, wherein the motorized tea leaf distributor is mounted to the first tea leaf container, wherein dispensing the predetermined tea mass comprises initiating motor rotation at the motorized leaf distributor to motivate the predetermined tea mass from the first tea leaf container.

10. A tea making appliance comprising:
    a base defining a dispenser cavity;
    a particulate guide directed at the dispenser cavity;
    a first tea leaf container mounted upstream from the particulate guide;
    a second tea leaf container mounted upstream from the particulate guide, the second tea leaf container being separate from the first tea leaf container;
    a motorized leaf distributor to selectively provide tea leaves to the particulate guide;
    a reservoir disposed upstream from the dispenser cavity;
    a water pump in fluid communication with the reservoir upstream from the dispenser cavity to direct water thereto;

a heating element provided in fluid communication with the reservoir upstream from the dispenser cavity to heat water thereto;

a distributor mounting frame above the particulate guide in support of the first tea leaf container and the second tea leaf container, the distributor mounting frame defining a water inlet downstream mounting from the heating element and a water outlet downstream from the water inlet, the distributor frame further defining a plurality of recessed grooves about a plurality of corresponding holes, the first and second tea leaf containers being received within separate recessed grooves of the plurality of recessed grooves to release tea leaves through separate holes of the plurality of corresponding holes; and a controller in operable communication with the motorized leaf distributor, the water pump, and the heating element, the controller being configured to initiate an automated brewing operation.

11. The tea making appliance of claim 10, wherein the automated brewing operation comprises receiving one or more data points regarding a physical user condition, selecting a personalized tea style based on the received one or more data points, and dispensing a predetermined tea mass of the personalized tea style automatically in response to selecting the personalized tea style.

\* \* \* \* \*